(12) United States Patent
Dillman

(10) Patent No.: US 8,275,526 B2
(45) Date of Patent: Sep. 25, 2012

(54) PLANTER ASSEMBLY WITH SELECTIVELY ACTUATED OUTPUT

(75) Inventor: Jeffrey Dillman, Ames, IA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/351,276

(22) Filed: Jan. 17, 2012

(65) Prior Publication Data

US 2012/0111248 A1    May 10, 2012

Related U.S. Application Data

(62) Division of application No. 12/984,720, filed on Jan. 5, 2011, now Pat. No. 8,145,396, which is a division of application No. 12/110,469, filed on Apr. 28, 2008, now Pat. No. 7,925,404.

(51) Int. Cl.
*A01C 7/00* (2006.01)
*A01C 9/00* (2006.01)
*G06F 7/70* (2006.01)
*G06F 19/00* (2006.01)
*G06G 7/00* (2006.01)

(52) U.S. Cl. .......... 701/50; 111/177; 111/200; 111/921; 111/922

(58) Field of Classification Search .............. 701/50; 111/170–173, 177–185, 200, 900, 921, 922
See application file for complete search history.

(56) References Cited

U.S. PATENT DOCUMENTS

| | | | | |
|---|---|---|---|---|
| 2,058,138 | A | * | 10/1936 | De Lancey ................ 222/15 |
| 2,328,392 | A | * | 8/1943 | Neracher et al. ........... 477/105 |
| 2,565,951 | A | * | 8/1951 | Crookston et al. ......... 73/152.44 |
| 3,054,251 | A | * | 9/1962 | Handley et al. ............ 368/6 |
| 4,050,091 | A | | 9/1977 | Goettel |
| 4,432,675 | A | | 2/1984 | Machnee |
| 5,815,865 | A | | 10/1998 | Washburn et al. |
| 5,915,313 | A | | 6/1999 | Bender et al. |
| 5,967,066 | A | | 10/1999 | Giles et al. |
| 6,003,455 | A | | 12/1999 | Flamme et al. |
| 6,145,455 | A | | 11/2000 | Gust et al. |
| 6,389,999 | B1 | | 5/2002 | Duello |
| 6,516,733 | B1 | | 2/2003 | Sauder et al. |
| 7,140,310 | B2 | | 11/2006 | Mayerle et al. |
| 7,140,405 | B2 | | 11/2006 | Lewis et al. |
| 7,311,004 | B2 | | 12/2007 | Giles |
| 7,395,769 | B2 | | 7/2008 | Jensen |
| 2003/0093971 | A1 | | 5/2003 | Terminella et al. |
| 2006/0276204 | A1 | | 12/2006 | Simpson et al. |
| 2007/0151824 | A1 | | 7/2007 | Dillman |

OTHER PUBLICATIONS

Layton W. Jensen; Individual Row Shut-Down Control of Farm Implements to Eliminate Overlap in Irregularly Shaped Areas of Application; filed Oct. 21, 2004, U.S. Appl. No. 10/970,053; USPTO; now abandoned.

\* cited by examiner

*Primary Examiner* — Christopher J. Novosad
(74) *Attorney, Agent, or Firm* — Zarley Law Firm, P.L.C.

(57) ABSTRACT

An actuating system for a planting device. The actuating system has an electric motor that provides an actuating force for a seed shaft. A pneumatic acting member is connected to a source of compressed air through a valve and positioned to engage the electric motor to actuate the electric motor. The source of compressed air and electric motor can thus be connected to a controller that operates the source of compressed air and the electric motor in order to provide selective actuation to control planting of the planting device.

18 Claims, 5 Drawing Sheets

PLANTER ASSEMBLY WITH SELECTIVELY ACTUATED OUTPUT

CROSS REFERENCE TO A RELATED APPLICATION

This application is a division of U.S. Ser. No. 12/984,720 filed Jan. 5, 2011 which is a division of U.S. Ser. No. 12/110,469 filed Apr. 28, 2008, now U.S. Pat. No. 7,925,404 issued Apr. 12, 2011.

BACKGROUND OF THE INVENTION

This invention is directed toward planters. More specifically, this invention is directed towards a method and means of controlling a planter.

Planter assemblies such as corn planters traverse through fields and plant seeds in order to provide a crop. When planting the seeds the location of each seed in the ground is crucial. Specifically, individual plants need to be located at a distance from one another that not only maximizes their potential to grow such that they are not overgrown or fighting with adjacent plants but additionally allows as many plants to grow as possible. Additionally, because many farms now require acres upon acres of land to be planted the seed planting process needs to be as efficient and fast as possible wherein the row planting may be controlled.

Thus, a principal object of the present invention is to provide enhanced seed planting control.

Another object of the present invention is to provide an actuating device that selectively deactivates a row unit based upon the geographic location of a planter as determined by a GPS system.

These and other objectives, features, and advantages will become apparent to one skilled in the art based upon the following disclosure.

BRIEF SUMMARY OF THE INVENTION

An actuating system for a planting device. The system has an electric motor that provides an actuating force for a seed shaft. A pneumatic actuating member is connected to a source of compressed air through a valve and is positioned to engage the electric motor to actuate the electric motor. The source of compressed air and the electric motor are connected to a controller that operates the source of compressed air and the electric motor in order to plant the seed.

DETAILED DESCRIPTION OF THE PREFERRED EMBODIMENT

Figure 1:
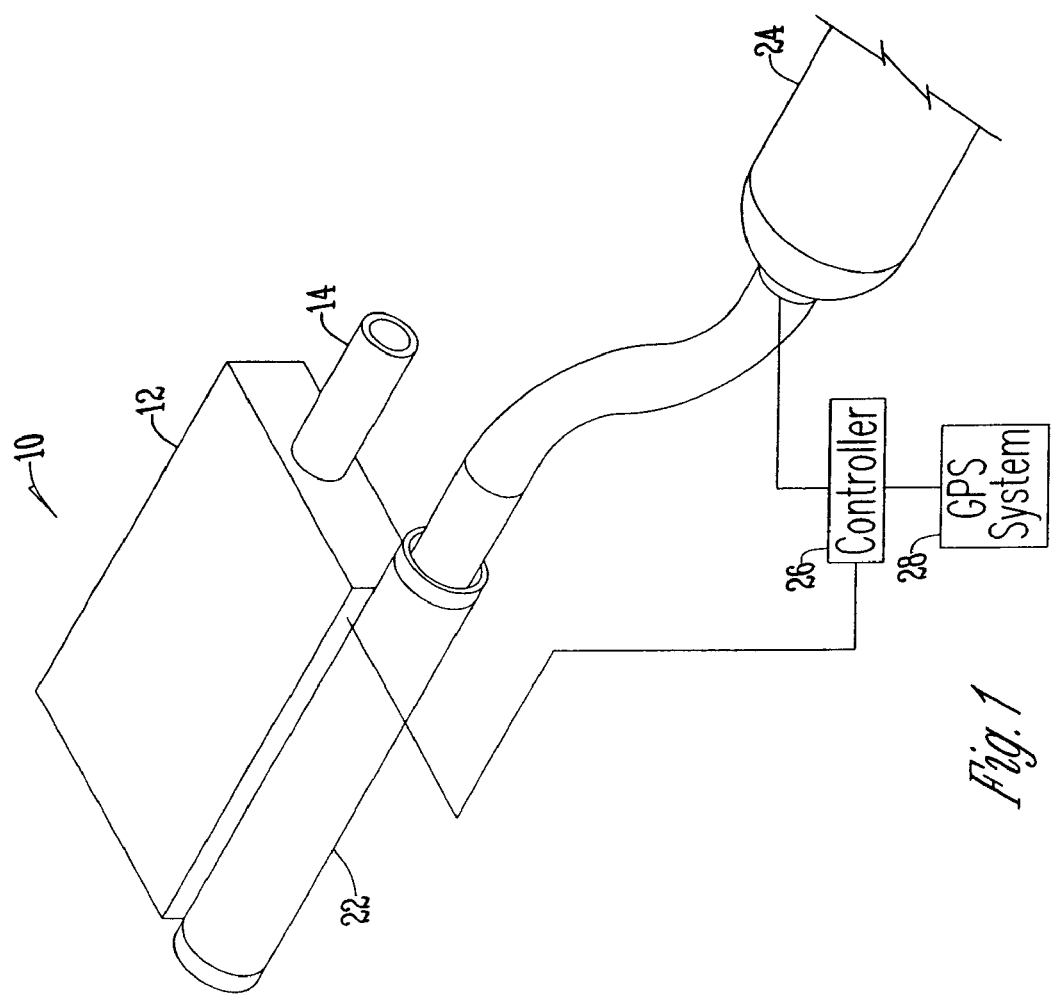
FIG. 1 is a perspective view of a valving system for a planter.

FIG. 1 shows a generic valving system 10 used within an actuating system for a planter. The valving system 10 includes an electric motor 12 that has a drive shaft 14 rotatably engaging and actuated by the electric motor 12. The electric motor 12 is selectively engaged and activated by pneumatic actuating member 22. The actuating member 22 is of any size, shape, and structure that permits expansion to engage the electric motor 12. One example of an actuating member 22 is a rubber tube that is operably connected to a source of compressed air 24. Alternatively, the actuating member 22 is an air bag connected to a source of compressed air 24 or an air cylinder that activates a piston that engages electric motor 12. Preferably, the actuating member 22 expands approximately 300% under 35 psi and has a compound on the outer surface of member 22 that becomes sticky as the member expands to better engage the electric motor 12.

The source of compressed air 24 is of any type including a 12 volt portable compressor mounted on a vehicle or a rechargeable portable tank without a compressor. The source of compressed air 24 may be electrically connected to a controller 26 that sends a signal to activate the source of compressed air 24 which in turn activates the pneumatic actuating member 22. The controller 26 may be wirelessly connected to a GPS system 28 to permit activation based geographic location. Additionally, controller 26 may be electrically connected to and in communication with the electric motor 12 such that the controller 26 can selectively activate the electric motor 12 to rotate the drive shaft 14.

Figure 2:
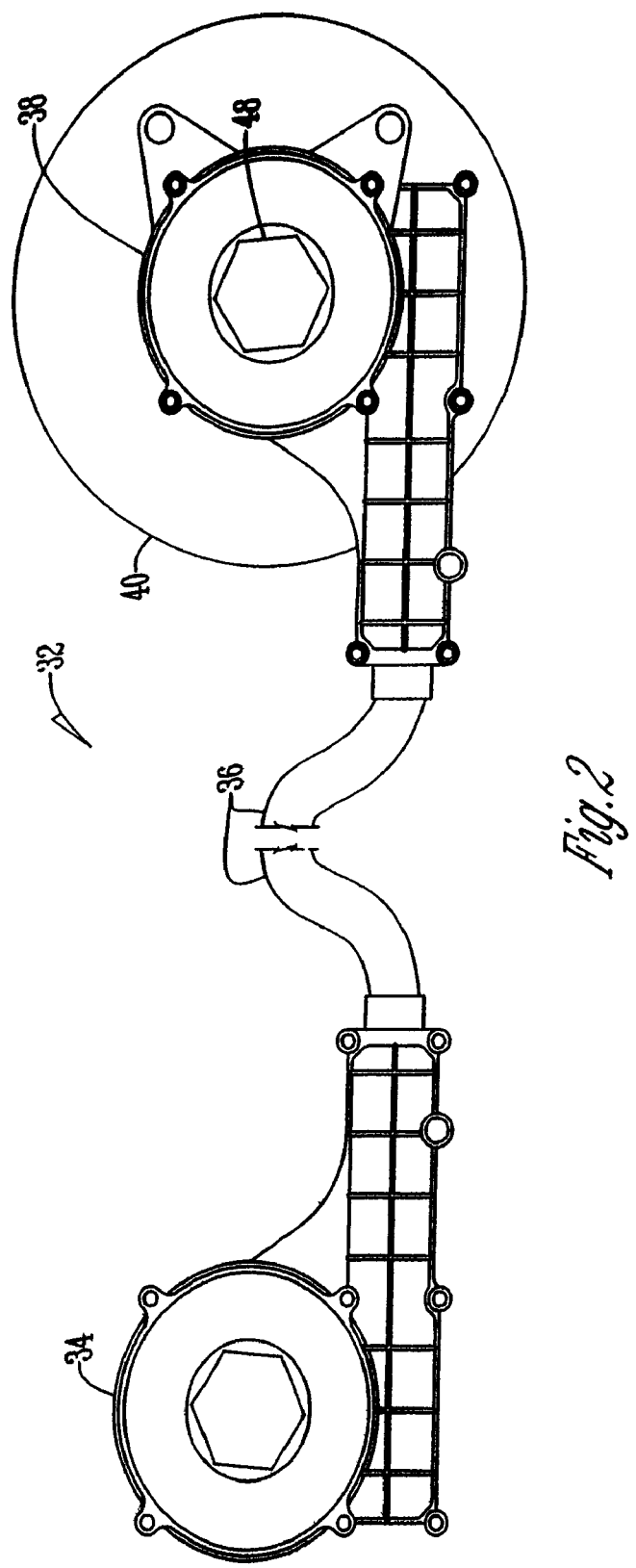
FIG. 2 is a side plan view of an actuating system for a planter.
Figure 3:
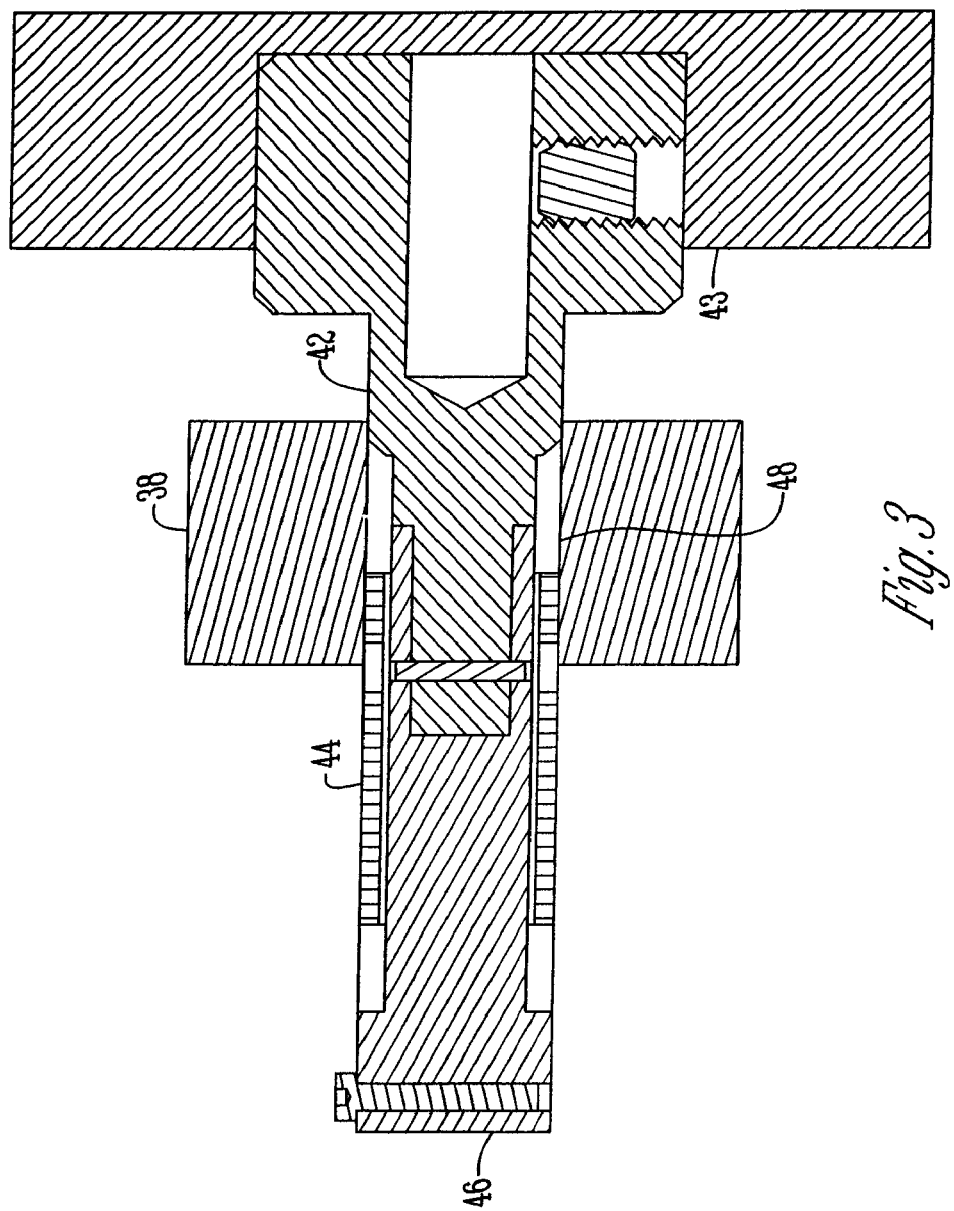
FIG. 3 is a sectional view of an actuating system for a planter.
Figure 4:
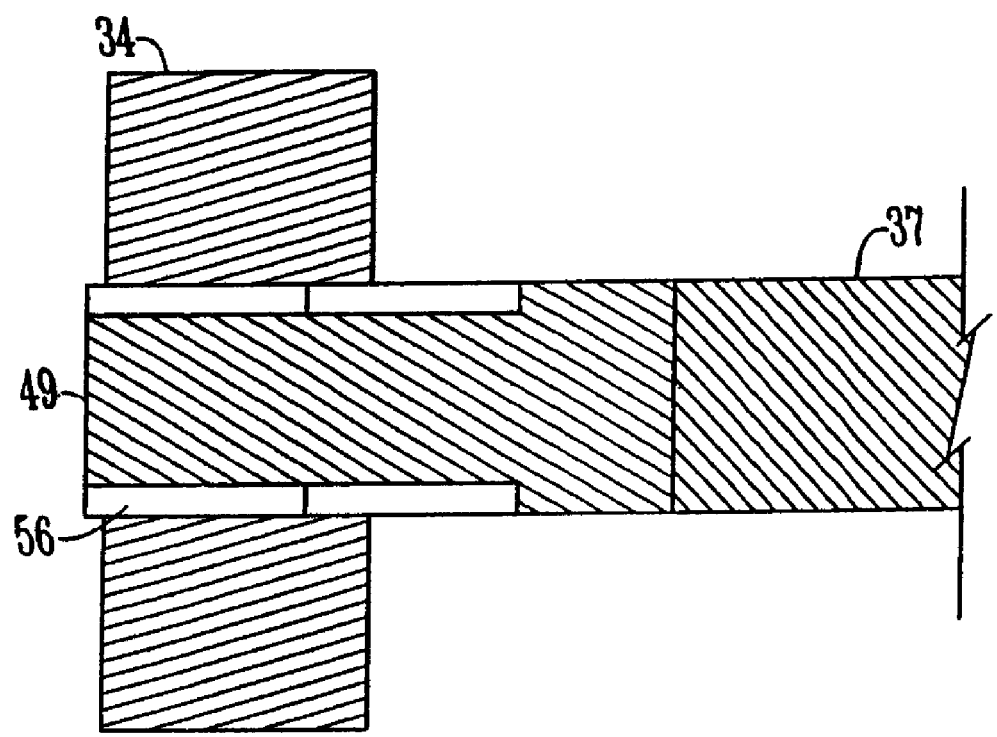
FIG. 4 is a sectional view of an actuating system for a planter.
Figure 5:
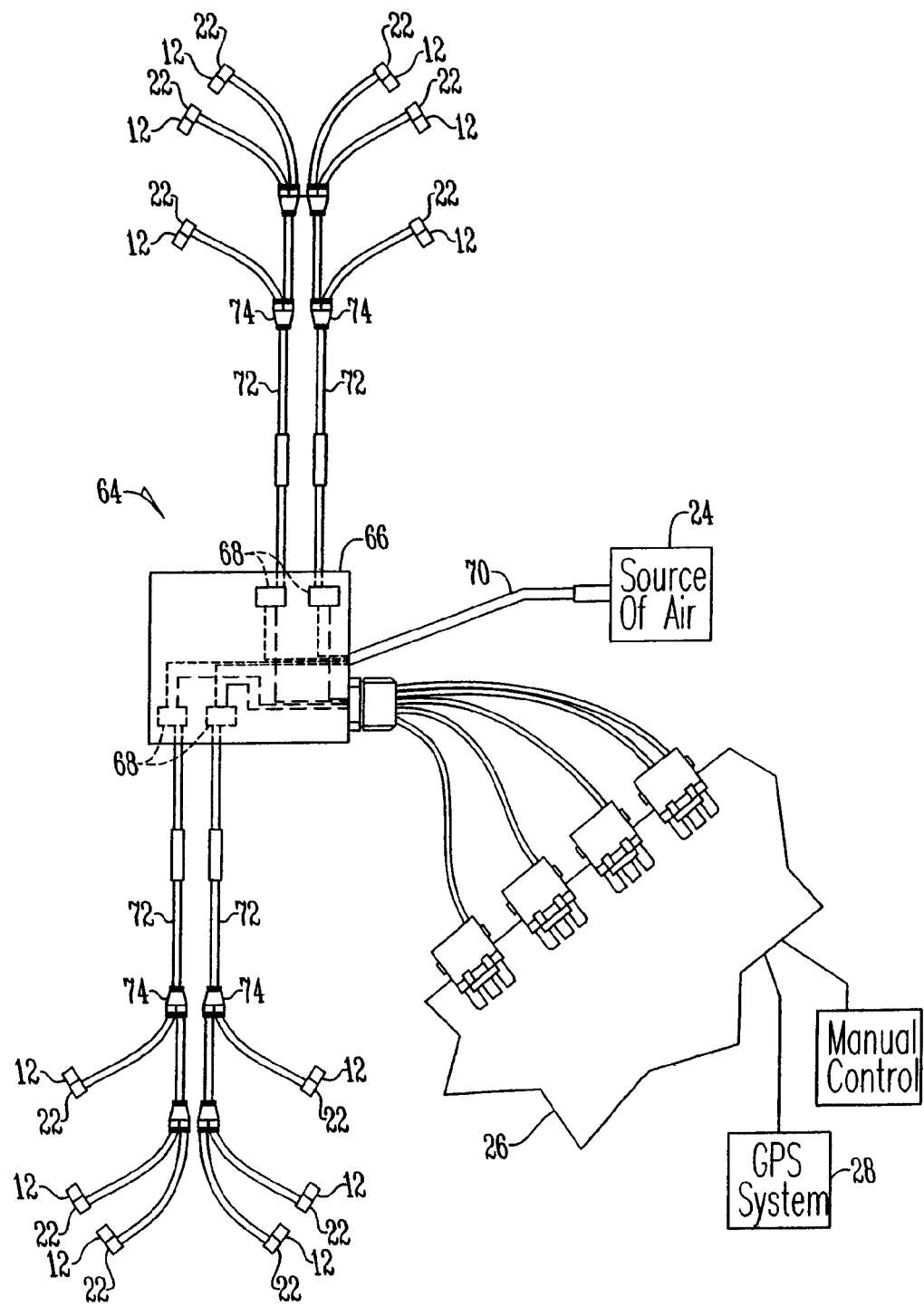
FIG. 5 is a schematic diagram of an actuating system for a planter.

In one embodiment the valve system 10 can be used in association with drive arrangement 32 in multiple locations as best shown in FIGS. 2-4. The drive arrangement 32 includes a drive gear 34 that is operatively connected to a drive shaft 36. Preferably the drive shaft 36 is flexible. The drive gear arrangement 34 is fixed to an implement shaft 37 (axial or engine) that provides rotational force to drive gear arrangement 34. Connected to the opposite end of the drive shaft 36 is a drive transmission 38. The drive transmission 38 is operatively connected to a metering structure 40 such as a row unit which deposits seed onto the ground. Drive is therefore provided from the axle or engine shaft 37 through the drive gear arrangement 34, drive shaft 36 and drive transmission 38 to drive the metering structure 40 to a speed proportional to the ground speed of the implement.

The connection between the drive transmission 38 and metering structure 40 includes a seed shaft 42 that is connected to a metering drive 43. Placed over the seed shaft 42 is a hollow tube 44. The hollow tube 44 is not attached to the seed shaft 42 and rather spins freely about the seed shaft 42. Placed inside the hollow tube 44 and attached to the seed shaft 42 is a transmission drive 46. In this manner, the transmission drive shaft 36 and the seed shaft 42 rotate in unison and the hollow tube 44 is free to rotate about both shafts 42 and 46. The hollow tube 44 is of any shape and is formed to fit within the bore 48 of the drive transmission 38 such that when drive shaft 36 is rotated the rotational force transfers to drive transmission 38 which causes the drive transmission 38 and the hollow tube 44 to rotate in unison. Preferably the hollow tube 44 and bore 48 are hex shaped.

In one embodiment an electrical motor is rotationally connected to the transmission drive shaft 36 such that the transmission drive shaft 36 is the drive shaft 14 of electric motor 12. Thus, when activated the electric motor 12 rotates the transmission drive shaft 36 that causes rotational force to be transferred to seed shaft 42 which in turn rotates the metering drive 43 of the metering structure 40. In this manner controller 26 can selectively actuate electric motor 12 in order to actuate the metering drive 43.

In yet another embodiment similarly the electric motor 12 can rotatably engage the seed shaft 42 such that seed shaft 42 is representative of the electric motor drive shaft 14. In this embodiment the controller 26 is able to selectively actuate the seed shaft 42 directly without consideration of the drive shaft 36.

Alternatively, in yet another embodiment a center member 49 is operably connected to drive gear 34 and axle or engine shaft 37 of drive gear arrangement 34. In this embodiment, similar to previous embodiments, the electric motor 12 may rotatably engage the center member 49 to provide rotation thereof such that rotation of center member 49 rotates drive gear 34. In this manner controller 26 can selectively actuate the drive gear 34 via the center member 49.

In order to selectively and independently activate a plurality of actuating members 22 a valve module 64 is electrically connected to the controller 26 for either manual activation or activation through a conventional GPS system. The valve module 64 includes a housing 66 that contains a plurality of valves 68. The valves 68 are connected, through the housing 66 to the source of compressed air 24 through tube 70. Also connected to each valve 68 at one end is an air tube 72 that is connected to the pneumatic actuating device 22 at the opposite end of the air tube 72. Multiple actuating members 22 may be connected to each air tube 72 through the use of at least one or more connectors 74 such as a Y or T connector. This connection system is known as "Daisy Chaining" and allows one to easily connect and disconnect actuating members 10 from the valves 68 based on the desired application. In this manner a group of actuating members 22 are activated when a selected valve 68 is activated by controller 26.

This system is particularly valuable in a planting device. For example, a twelve row planter using a valve module 64 having four valves 68 be set to control four sections of three rows each. Should greater control be desired a second valve module 64 may be added having two valves 68 so that the modules 64 may be set to control six sections of two rows each. For even further control the controller 26 is able to control the electric motor 12 associated with the planter such that when certain rows are not desired to be planted the controller 26 can prevent actuation of the electric motor 12 such that even when Daisy Chaining the rows can be controlled. Thus, this adds even greater control and for more possibilities when planting the seeds in rows.

In operation the controller 26 transmits a signal to activate the source of compressed air 38, selectively activates valves 48 and selectively operates electric motors 12 based either on a manual command or a geographic location as determined by the GPS system 28. Once activated valve 68 permits compressed air to travel through tube 72 to the actuating member 22 to activate the actuating member 22. At this time the electric motor 12 is activated and operable and plants seed unless the controller 26 signals an individual electric motor 12 otherwise. As a result, an improved control is provided and at the very least all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. An actuating system for a planter comprising:
    a drive arrangement including a drive gear operatively connected to a drive shaft that is operatively connected to a drive transmission;
    a drive shaft connected to a seed shaft that is operatively connected to a metering structure;
    an electric motor that rotationally engages the drive shaft;
    an actuating device positioned to engage the electric motor; and
    wherein the actuating member and electric motor are connected to a controller and the controller activates the actuating member and electric motor based on a geographic location determined by a GPS system.

2. The system of claim 1 wherein the actuating member is pneumatic.

3. The system of claim 1 wherein the actuating member is connected to a source of compressed air through a valve.

4. The system of claim 3 wherein the source of compressed air is connected to a controller that activates the source of compressed air.

5. The system of claim 3 wherein the controller activates the source of compressed air based on a manual command.

6. The system of claim 3 wherein the controller activates the source of compressed air based on a geographic location determined by a GPS system.

7. The system of claim 1 wherein more than one actuating member is positioned to engage more than one electric motor, the actuating members connected to a valve module having more than one valve.

8. The system of claim 1 wherein the controller is connected to a source of compressed air and the valve module to activate the valves and the source of compressed air.

9. The system of claim 8 wherein the valves are connected to more than one actuating member.

10. The system of claim 9 wherein the controller activates the compressed air and the valves based on a geographic location determined by a GPS system.

11. The system of claim 8 wherein the controller activates the compressed air and the valves based on a manual command.

12. An actuating system for a planter, comprising:
    a drive arrangement including a drive gear operatively connected to a drive shaft that is operatively connected to a drive transmission;
    a drive shaft connected to a seed shaft that is operatively connected to a metering structure;
    an electric motor that rotationally engages the seed shaft;
    an actuating device positioned to engage the electric motor; and
    wherein the actuating member and electric motor are connected to a controller and the controller activates the actuating member and electric motor based on a geographic location determined by a GPS system.

13. The system of claim 12 wherein the actuating member is pneumatic.

14. The system of claim 13 wherein the actuating member is connected to a source of compressed air through a valve.

15. The system of claim 13 wherein the source of compressed air is connected to a controller that activates the source of compressed air.

16. The system of claim 15 wherein the controller activates the source of compressed air based on a manual command.

17. The system of claim 15 wherein the controller activates the source of compressed air based on a geographic location determined by a GPS system.

18. The system of claim 13 wherein more than one actuating member is positioned to engage more than one electric motor and the actuating members connected to more than one valve.

* * * * *